May 7, 1963  R. A. HENDERSON  3,088,447
CONTROL FOR AUTOMOTIVE EXHAUST AIR POLLUTION
Filed Dec. 5, 1961  4 Sheets-Sheet 1
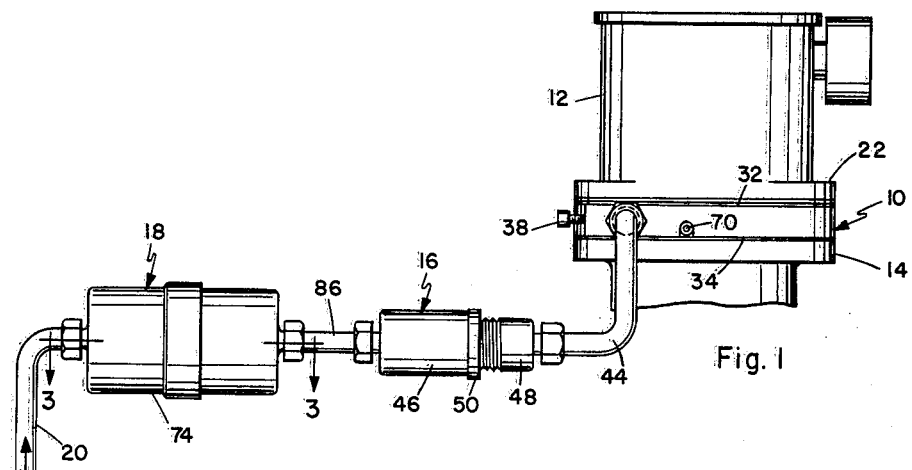
Fig. 1
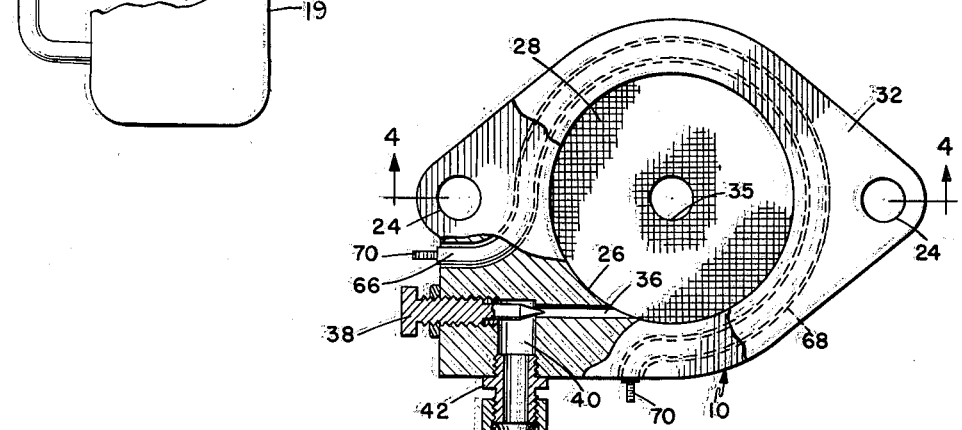
Fig. 2
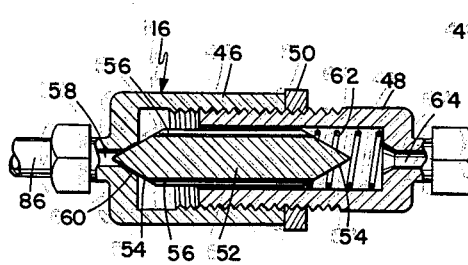
INVENTOR.
RAY A. HENDERSON
BY
Knox & Knox

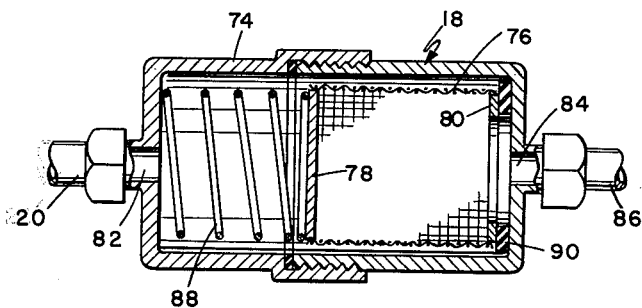
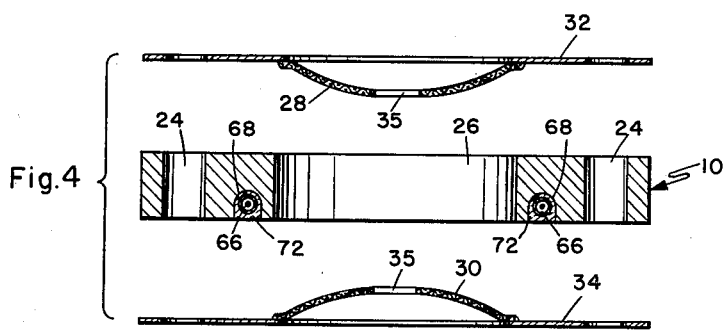

May 7, 1963    R. A. HENDERSON    3,088,447
CONTROL FOR AUTOMOTIVE EXHAUST AIR POLLUTION
Filed Dec. 5, 1961    4 Sheets-Sheet 3

INVENTOR.
RAY A. HENDERSON
BY
Knox & Knox

May 7, 1963   R. A. HENDERSON   3,088,447
CONTROL FOR AUTOMOTIVE EXHAUST AIR POLLUTION
Filed Dec. 5, 1961   4 Sheets-Sheet 4
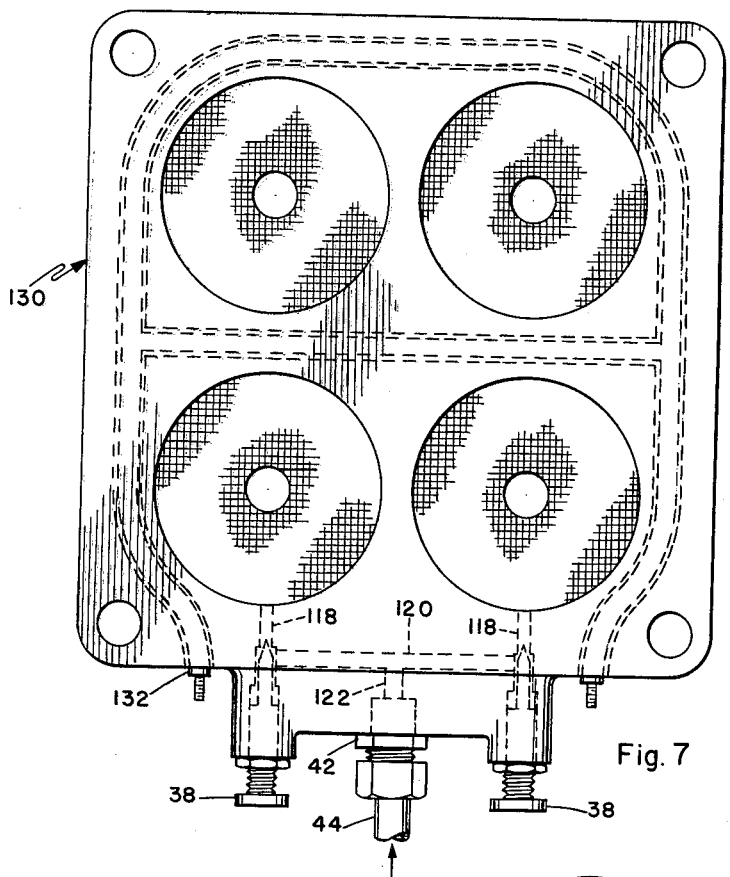
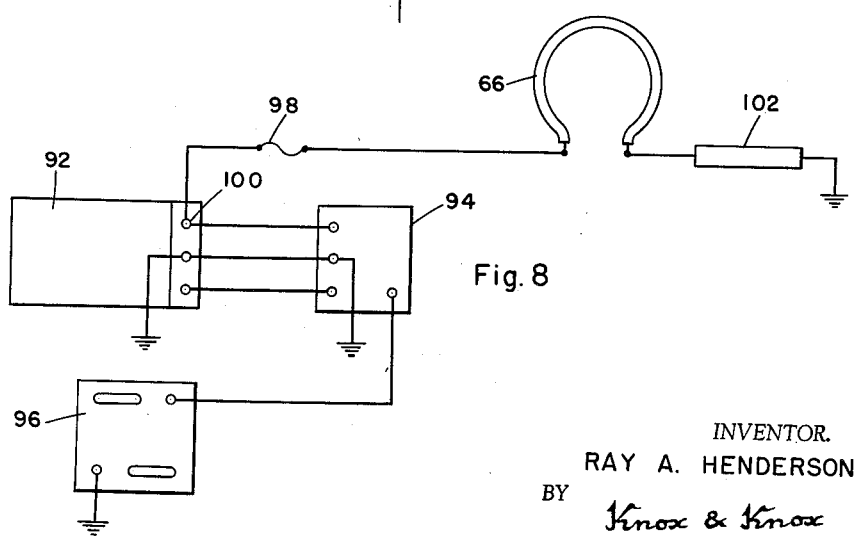
INVENTOR.
RAY A. HENDERSON
BY
Knox & Knox

United States Patent Office 3,088,447
Patented May 7, 1963

3,088,447
CONTROL FOR AUTOMOTIVE EXHAUST AIR POLLUTION
Ray A. Henderson, San Diego, Calif., assignor of five percent to Alvin H. Tutt, Chula Vista, Calif., five percent to Cletus L. Kathol, San Diego, Calif., five percent to John L. Neill, San Diego, Calif., and twenty percent to James A. Willott, Chula Vista, Calif.
Filed Dec. 5, 1961, Ser. No. 157,159
6 Claims. (Cl. 123—119)

This application is a continuation-in-part of U.S. application Serial No. 86,565 filed January 25, 1961.

The present invention relates generally to automotive vehicles and more particularly to control for automotive exhaust air pollution.

Most internal combustion engines in automotive vehicles have breather pipes extending from the crankcase with outlets below the vehicles. The purpose of such a breather pipe is to avoid pressure build-up in the crankcase and allow excess vapors to escape. In older vehicles, especially, part of the combustion products from the cylinders enters the crankcase by blowing by the piston rings, and the gases must escape through the breather pipe. These gases, together with exhaust gases contribute a great portion of the air pollutants in large cities. By preventing free escape of the crankcase vapors and by improving combustion in the engine, most of the pollutant products can be eliminated.

The primary object of this invention, therefore, is to provide means for controlling air pollution from automotive exhaust gases by conducting crankcase vapors through the intake manifold, to combine with the fuel and air mixture from the carburetor and be subjected to combustion in the cylinders.

Another object of this invention is to provide means for heating the fuel and air mixture by an adapter in the carburetor mounting, in order to vaporize the fuel and ensure more efficient combustion, the crankcase vapors being fed in through the adapter.

Another object of this invention is to provide means by which the intake of crankcase vapors is controlled by a vacuum actuated valve, dependent on engine speed, and including means in the special adapter to regulate the flow accurately.

Finally, it is an object to provide air pollution control means of the aforementioned character which is simple and convenient to construct and install and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 1 is a fragmentary side elevation view of the air pollution control system applied to a carburetor;

FIGURE 2 is a top plan view of the special carburetor adapter, partially cut away, the vacuum operated valve being shown in section;

FIGURE 3 is a sectional view of the oil separator taken on line 3—3 of FIGURE 1;

FIGURE 4 is a sectional view taken on line 4—4 of FIGURE 2, the upper and lower screens being separated;

FIGURE 7 is a top plan view of an adapter for a four barrelled carburetor; and

FIGURE 8 is a wiring diagram of the electrical heating circuit.

GENERAL STRUCTURE

Figure 5:
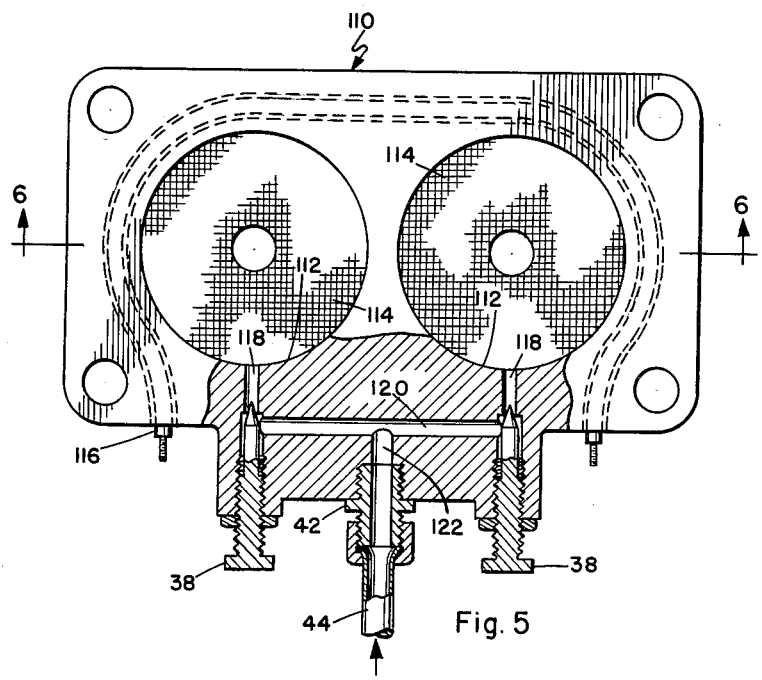
FIGURE 5 is a top plan view, partially cut away, of an adapter for a double barrelled carburetor.

With reference to FIGURES 1–4 of the drawings, the system includes an adapter 10 which fits between a carburetor 12 and the intake manifold 14, the adapter being coupled through a valve 16 and oil separator 18 to the engine crankcase 19. Connection to the crankcase is made by a pick-up pipe 20, which can be attached in any suitable manner in place of the usual breather pipe, the specific arrangement varying with different engines.

The adapter 10 is a thick, plate-like element shaped to conform to the carburetor mounting flange 22 and having properly spaced bolt holes 24 for attachment by the existing carburetor retaining bolts or studs. The adapter has an opening 26 corresponding to the carburetor throat opening and is enclosed by upper and lower screens 28 and 30 secured to thin retaining plates 32 and 34, respectively. Screens 28 and 30 are dished inwardly to provide more surface area than flat discs, and consequently more open area of perforations, to avoid obstruction of flow. In addition the screens have small central openings 35 which allow unimpeded flow of the central air stream containing fuel from the carburetor venturis. The retaining plates are similar in shape to the adapter and are held by the same bolts.

In the wall of opening 26 is an inlet port 36 fitted with an adjustable needle valve 38 of conventional type. Communicating with the inlet port 36 is an inlet 40 having a threaded connector 42 from which an inlet pipe 44 leads to valve 16.

The valve 16, illustrated in FIGURE 2, has a cylindrical body comprising two threadedly interconnected portions 46 and 48, with a threaded locking ring 50 to set a particular adjusted length. Inside the valve is an axially slidable valve element 52 having substantially conical ends 54 and being provided with longitudinal flutes 56 to allow passage of vapor. The outer body portion 46, remote from adapter 10, has an inlet 58 with a seat 60 to receive one conical end 54 of the valve element 52, said valve element being held in the seat by a compression spring 42 in the inner body portion 48, which has an outlet 64 connected to pipe 44.

In order to vaporize fuel from the carburetor as it passes through opening 26, the adapter is provided with a heating element 66 seated in a channel 68 in the lower surface of the adapter. The heating element 66 extends around the major portion of opening 26 and has end terminals 70 for connection to an electrical circuit. To avoid displacement the heating element is preferably held in place by heat resistant cementitious material indicated at 72 in FIGURE 4. Suitable resistance type heating elements can be formed in various shapes and made with specific heat outputs to suit any requirements.

Since some of the vapor from the crankcase may condense before reaching the adapter 10, it is preferable to use the oil separator 18 in the line before valve 16. In FIGURE 3, the oil separator is illustrated as a simple unit having a separable casing 74, to permit draining when necessary, the casing containing a cylindrical screen element 76 closed at one end by a flat plate 78 and reinforced at the other end by a ring 80. Pick-up pipe 20 enters the inlet end 82 of the oil separator and the vapors strike the plate 78, which causes any condensate to settle to the bottom of the casing while the vapors pass around and into the screen element 76 and escape through outlet end 84. From outlet 84 a short connecting pipe 86 leads to the inlet 58 of valve 16. The screen element 76 is held against outlet end 84 by a spring 88 and a gasket 90 may be used for sealing to prevent escape of liquid oil.

Operation

In normal operation the flow through the carburetor 12 and the adapter 10 causes a pressure drop at inlet port 36, the resultant vacuum effect pulling valve element 52 clear of its seat and drawing vapor from the crankcase. The vapor is mixed with the fuel and air passing through opening 26 and travels to the cylinders where combustion takes place. Thus oil vapor and blow-by products from the crankcase are added to the fuel and air, the blow-by products usually containing unburned fuel. At the same time, the heating element 66 heats all of the products in the adapter opening 26 and causes vaporization of the fuel for more efficient combustion. The upper and lower screens 28 and 30 serve to impede the flow just sufficiently to allow proper heating, but do not interfere with normal functioning of the engine.

The faster the engine speed, the higher the vacuum will be at inlet port 36 and the more valve 16 will be opened to pass crankcase vapors. However, since a saturation of the fuel and air mixture by the crankcase vapors would result in reduced combustion efficiency, the needle valve 38 is used to adjust the flow of vapors into the inlet port 36 to a proper level.

The heating element 66 is energized by the existing vehicle electrical circuit, as in FIGURE 8, which indicates the usual generator 92, voltage regulator 94 and battery 96. The heating element has one end coupled, through a fuse 98, to the "hot" terminal 100 of battery 96, the other end being grounded through a temperature actuated switch 102, such as a thermostatic device of well known type.

It has been found in tests that the apparatus will reduce pollutants in the vehicle exhaust to approximately 90 p.p.m. (parts per million). This is in contrast to a suggested tolerable maximum of 275 p.p.m. by pollution control authorities. In one particular test with the vehicle cruising at 35 miles per hour, a sample of the exhaust products was found to contain 2.2 p.p.m. of carbon monoxide, 45 p.p.m. of oxides of nitrogen and 90 p.p.m. of hydrocarbon material which is the most undesirable pollutant product.

Exhaust heating means may be used in lieu of the electric means illustrated.

Adaptation to Multi-barrelled Carburetors

Figure 6:
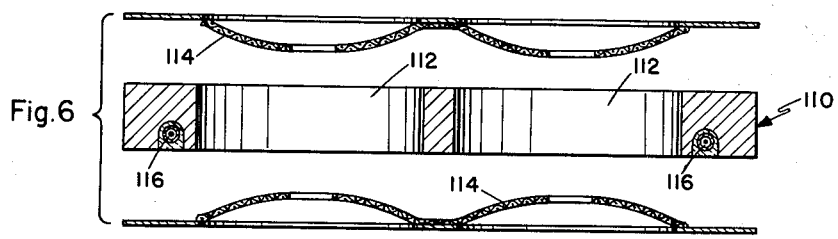
FIGURE 6 is a sectional view taken on line 6—6 of FIGURE 5, with the screens separated.

The adapter illustrated in FIGURES 1, 2, and 4 is a simple unit for single barrelled carburetors, but the structure is easily applied to multi-barrelled systems. FIGURES 5 and 6 illustrate an adapter 110 for a dual barrel carburetor and having two openings 112, the openings being covered by corresponding upper and lower screens 114. A heating element 116 is embedded in the adapter and extends around both openings 112. Each opening 112 has an inlet port 118 fitted with a needle valve 38, both inlet ports being connected by a passage 120 to a common inlet 122 provided with a threaded connector 42. The operation is similar to that previously described, but the dual needle valves make it possible to adjust vapor flow into the individual openings of the adapter.

An adapter 130 for a four barrel carburetor is illustrated in FIGURE 7, the arrangement of ports, vapor inlet and needle valves being as described for adapter 110. The heating element 132, however, is disposed in a suitable manner to surround as great a portion of the openings as possible. It is not necessary to inject crankcase vapors into all four barrels of the carburetor system although, if desired, the inlet arrangement could be duplicated for each pair of openings.

Advantages

The system is a complete assembly of components which can be readily attached to most types of vehicles without interfering with existing equipment, adjustments or operation. The adapter fits between the carburetor and intake manifold and a pipe leads to the crankcase, the valve and oil separator being located at any convenient positions in the pipe. Vapors from the crankcase pass into the engine manifold instead of being vented below the vehicle, the flow being controlled according to engine speed by a vacuum operated valve and the adapter having means for metering the flow accurately for most effective operation. If, due to unforeseen circumstances, crankcase pressure should increase, the pressure will open the flow control valve regardless of vacuum action and allow the vapor to escape without danger of damage to the crankcase. The components are subject to a minimum of wear and are easy to service when necessary.

It is understood that minor variation from the form of the invention disclosed herein may be made without departure from the spirit and scope of the invention, and that the specification and drawings are to be considered as merely illustrative rather than limiting.

I claim:

1. In combination with an internal combustion engine having a crankcase, a source of combustible mixture and an intake manifold to supply the mixture to the engine; means for reducing the air pollutant products of the engine, comprising:
    an adapter mounted between said source of combustible mixture and said intake manifold and having an opening through which the combustible mixture passes;
    an inlet port in said opening;
    a pipe connecting said inlet port with said crankcase to conduct crankcase vapors into said opening;
    a flow control valve in said pipe;
    and an adjustable metering valve in said inlet port.

2. In combination with an internal combustion engine having a crankcase, a source of combustible mixture and an intake manifold to supply the mixture to the engine; means for reducing the air pollutant products of the engine, comprising:
    an adapter mounted between said source of combustible mixture and said intake manifold and having an opening through which the combustible mixture passes;
    an inlet port in said opening;
    a pipe connecting said inlet port with said crankcase to conduct crankcase vapors into said opening;
    fine mesh screens extending across and enclosing both ends of said opening;
    a flow control valve in said pipe;
    and an adjustable metering valve in said inlet port.

3. The combination of claim 2 wherein said screens are inwardly dished and have substantially central openings therein.

4. In combination with an internal combustion engine having a crankcase, a source of combustible mixture and an intake manifold to supply the mixture to the engine; means for reducing the air pollutant products of the engine, comprising:
    an adapter mounted between said source of combustible mixture and said intake manifold and having an opening through which the combustible mixture passes;
    an inlet port in said opening;
    a pipe connecting said inlet port with said crankcase to conduct crankcase vapors into said opening;
    fine mesh screens extending across and enclosing both ends of said opening;
    a channel in said adapter substantially surrounding said opening;
    a heating element secured in said channel;
    a flow control valve in said pipe;
    and an adjustable metering valve in said inlet port.

5. The combination of claim 3 and including an oil separator in said pipe between said crankcase and said flow control valve.

6. In combination with an internal combustion engine having a crankcase, a source of combustible mixture and an intake manifold to supply the mixture to the engine;

means for reducing the air pollutant products of the engine, comprising:

an adapter mounted between said source of combustible mixture and said intake manifold and having an opening through which the combustible mixture passes;

an inlet port in said opening;

a pipe connecting said inlet port with said crankcase to conduct crankcase vapors into said opening;

a flow control valve in said pipe operable by engine induced vacuum to control flow of crankcase vapors according to engine speed and heating means in said adapter adjacent said opening.

References Cited in the file of this patent

UNITED STATES PATENTS

| | | |
|---|---|---|
| 1,613,789 | Devary | Jan. 11, 1927 |
| 2,240,459 | McDowell | Apr. 29, 1941 |
| 2,359,485 | Lowther | Oct. 3, 1944 |
| 2,423,592 | Foster | July 8, 1947 |
| 2,731,958 | Robley | Jan. 24, 1956 |
| 2,742,057 | Krieck | Apr. 17, 1956 |